(12) United States Patent
Kim

(10) Patent No.: US 9,906,744 B2
(45) Date of Patent: Feb. 27, 2018

(54) IMAGE SENSOR HAVING PHASE DIFFERENCE DETECTION PIXELS FOR FOCUS DETECTION, AND IMAGE PICK-UP APPARATUS INCLUDING THE IMAGE SENSOR

(71) Applicant: LG INNOTEK CO., LTD., Seoul (KR)

(72) Inventor: Min Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 101 days.

(21) Appl. No.: 14/816,119

(22) Filed: Aug. 3, 2015

(65) Prior Publication Data

US 2016/0037104 A1    Feb. 4, 2016

(30) Foreign Application Priority Data

Aug. 4, 2014   (KR) .................... 10-2014-0099675

(51) Int. Cl.
| | |
|---|---|
| H04N 5/369 | (2011.01) |
| H04N 9/077 | (2006.01) |
| H04N 9/04 | (2006.01) |
| H04N 5/232 | (2006.01) |

(52) U.S. Cl.
CPC ....... *H04N 5/3696* (2013.01); *H04N 5/23212* (2013.01); *H04N 9/045* (2013.01); *H04N 9/077* (2013.01); *H04N 5/23209* (2013.01); *H04N 2209/042* (2013.01)

(58) Field of Classification Search
CPC .. H04N 5/3696; H04N 9/077; H04N 5/23212; H04N 9/045; H04N 5/23209; H04N 2209/042

USPC ................................................... 348/345–357
See application file for complete search history.

(56) References Cited

U.S. PATENT DOCUMENTS

| | | | | |
|---|---|---|---|---|
| 9,420,164 | B1* | 8/2016 | Galor Gluskin ... | H04N 5/23212 |
| 2011/0228127 | A1* | 9/2011 | Nakagawa ............ | G02B 7/34 348/222.1 |
| 2012/0038810 | A1* | 2/2012 | Taniguchi ......... | H01L 27/14621 348/308 |
| 2013/0258168 | A1* | 10/2013 | Aoki ....................... | G02B 7/34 348/349 |
| 2015/0022691 | A1* | 1/2015 | Matsunaga .......... | H04N 5/2176 348/231.6 |
| 2015/0097992 | A1* | 4/2015 | Okazawa .............. | H04N 5/243 348/241 |

(Continued)

FOREIGN PATENT DOCUMENTS

| | | |
|---|---|---|
| KR | 2012-0127903 A | 11/2012 |
| WO | 2012-128153 A1 | 9/2012 |

*Primary Examiner* — Shahbaz Nazrul
(74) *Attorney, Agent, or Firm* — LRK Patent Law Firm

(57) ABSTRACT

An image sensor and an image pick-up apparatus including the same are provided. The image sensor includes a plurality of phase difference detection pixels and a plurality of image detection pixels arranged in a lattice pattern together with the phase difference detection pixels, wherein the phase difference detection pixels are arranged at an interval of a predetermined number of pixels in the lattice pattern, and the predetermined number of pixels has a maximum value of 16. In a phase difference detection type auto focus (AF) system, focus accuracy is improved without deterioration of image quality.

15 Claims, 8 Drawing Sheets

(56) References Cited

U.S. PATENT DOCUMENTS

| | | | | |
|---|---|---|---|---|
| 2015/0156400 A1* | 6/2015 | Seo | .................... | H04N 5/23212 |
| | | | | 348/353 |
| 2016/0105600 A1* | 4/2016 | Omata | ..................... | G02B 7/34 |
| | | | | 348/140 |
| 2016/0212364 A1* | 7/2016 | Okazawa | ........... | H04N 5/23229 |
| 2016/0301847 A1* | 10/2016 | Okazawa | ........... | H04N 5/23212 |
| 2016/0337575 A1* | 11/2016 | Akiyama | ................. | G02B 7/34 |
| 2016/0381284 A1* | 12/2016 | Aoki | ................. | H04N 5/23212 |
| | | | | 348/349 |

* cited by examiner

| | ... | m-3 | m-2 | m-1 | m | m+1 | m+2 | m+3 | ... | | | |
|---|---|---|---|---|---|---|---|---|---|---|---|---|
| n-3 | | R | G | R | G | R | G | R | G | R | G | R | G |
| n-2 | | G | B | G | B | G | B | G | B | G | B | G | B |
| n-1 | | R | G | R | G | R | G | R | G | R | G | R | G |
| n | | G | B | G | B | G | ■ | B | G | B | ■ | G | B | G | B |
| n+1 | | R | G | R | G | R | G | R | G | R | G | R | G |
| n+2 | | G | B | G | B | G | B | G | B | G | B | G | B |
| n+3 | | R | G | R | G | R | G | R | G | R | G | R | G |
| ⋮ | | G | B | G | B | G | B | G | B | G | B | G | B |

| G23 | | G24 | | G13 | | G14 |
|---|---|---|---|---|---|---|
| | G12 | | G5 | | G6 | |
| G22 | | G1 | | G2 | | G15 |
| | G11 | | G | | G7 | |
| G21 | | G4 | | G3 | | G16 |
| | G10 | | G9 | | G8 | |
| G20 | | G19 | | G18 | | G17 |

10A

IMAGE SENSOR HAVING PHASE DIFFERENCE DETECTION PIXELS FOR FOCUS DETECTION, AND IMAGE PICK-UP APPARATUS INCLUDING THE IMAGE SENSOR

CROSS REFERENCE TO RELATED APPLICATION

This application claims priority under 35 U.S.C. § 119 to Korean Patent Application No. 10-2014-0099675, filed in Korea on Aug. 4, 2014, which is hereby incorporated in its entirety by reference as if fully set forth herein.

BACKGROUND OF THE INVENTION

1. Field of the Invention

Embodiments relate to an image sensor and an image pick-up apparatus including the same.

2. Description of Related Art

With the increase in demand for high-quality image acquisition technology in an image acquisition apparatus, such as a camera, an auto focus (AF) system has been increasingly applied to cameras for mobile phones or small-sized mobile devices as well as digital cameras and an interchangeable lens cameras.

A phase difference detection type AF system or a contrast detection type AF system is mainly used as the AF system.

In the contrast detection type AF system, high frequency data are extracted from image data acquired by an image sensor, and AF control is performed to maximize the high frequency data. To this end, a signal processing circuit is required. However, an additional sensor or an optical system is not needed. Consequently, the AF system may be configured at relatively low cost. However, the contrast detection type AF system is slower and less accurate than the phase difference detection type AF system.

In the phase difference detection type AF system, light incident through a pick-up lens is pupil-divided into a pair of images, and a phase difference, which is an interval between the images, is detected to set the position of the pick-up lens, thereby detecting focus.

In the phase difference detection type AF system, a phase difference detection AF sensor may be provided separately from the pick-up lens, or phase difference detection pixels may be arranged in an image sensor.

In the phase difference detection type AF system, focus accuracy is improved as the number of phase difference detection pixels is increased. However, the phase difference detection pixels each have a narrower opening than general image detection pixels and thus have low sensitivity. As a result, image quality is deteriorated when the number of phase difference detection pixels is increased.

In order to perform accurate focus adjustment without deterioration of image quality in an AF system using phase difference detection pixels, therefore, it is necessary to properly arrange the phase difference detection pixels.

SUMMARY

Embodiments provide an image sensor including phase difference detection pixels arranged to realize accurate auto focus without deterioration of image quality and an image pickup apparatus including the same.

In one embodiment, an image sensor includes a plurality of phase difference detection pixels and a plurality of image detection pixels arranged in a lattice pattern together with the phase difference detection pixels, wherein the phase difference detection pixels are arranged at an interval of a predetermined number of pixels in the lattice pattern, and the predetermined number of pixels has a maximum value of 16.

The lattice pattern may include at least one lattice unit, and the at least one lattice unit may have a 2×2 matrix.

The lattice unit may include a first color pixel and a second color pixel opposite to each other in a first diagonal direction, and a third color pixel and a fourth color pixel opposite to each other in a second diagonal direction intersecting the first diagonal direction.

The phase difference detection pixels may be arranged on the first and second color pixels.

The first and second colors may be green.

The phase difference detection pixels may include first group pixels each having a shield region deviated at one side and second group pixels each having a shield region deviated at the other side.

The first group pixels may be spaced apart from each other at an interval of 16 pixels, and each of the first group pixels and a corresponding one of the second group pixels may be spaced apart from each other at an interval of 2 to 16 pixels.

The first group pixels may be spaced apart from each other at a predetermined interval in a row direction such that the first group pixels are arranged in a first arrangement line, and the second group pixels may be spaced apart from each other at a predetermined interval in the row direction such that the second group pixels are arranged in a second arrangement line, the first arrangement line and the second arrangement line being alternately arranged in a column direction.

Distribution density of the phase difference detection pixels may be gradually increased toward an outer portion of the image sensor.

In another embodiment, an image pick-up apparatus includes an optical unit for receiving an optical signal, an image sensor for generating image information from the optical signal received from the optical unit, and an image processing unit for processing the image information, wherein the image sensor includes a plurality of phase difference detection pixels and a plurality of image detection pixels arranged in a lattice pattern together with the phase difference detection pixels, and the phase difference detection pixels are arranged at an interval of a predetermined number of pixels in the lattice pattern, and the predetermined number of pixels has a maximum value of 16.

The lattice pattern may include at least one lattice unit, and the at least one lattice unit may have a 2×2 matrix.

The lattice unit may include a first color pixel and a second color pixel opposite to each other in a first diagonal direction, and a third color pixel and a fourth color pixel opposite to each other in a second diagonal direction intersecting the first diagonal direction.

The phase difference detection pixels may be arranged on the first and second color pixels.

The first and second colors may be green.

The phase difference detection pixels may include first group pixels each having a shield region deviated at one side and second group pixels each having a shield region deviated at the other side.

The first group pixels may be spaced apart from each other at an interval of 16 pixels, and each of the first group pixels and a corresponding one of the second group pixels may be spaced apart from each other at an interval of 2 to 16 pixels.

The first group pixels may be spaced apart from each other at a predetermined interval in a row direction such that the first group pixels are arranged in a first arrangement line, and the second group pixels may be spaced apart from each other at a predetermined interval in the row direction such that the second group pixels are arranged in a second arrangement line, the first arrangement line and the second arrangement line being alternately arranged in a column direction.

Distribution density of the phase difference detection pixels may be gradually increased toward an outer portion of the image sensor.

The image processing unit may process the image information of the phase difference detection pixels using image information of the image detection pixels surrounding the phase difference detection pixels.

The image detection pixels may be green pixels arranged in lattice patterns each having a 7×7 matrix, at a center of which a corresponding one of the phase difference detection pixels is located.

BRIEF DESCRIPTION OF THE DRAWINGS

Arrangements and embodiments may be described in detail with reference to the following drawings in which like reference numerals refer to like elements and wherein:

FIG. 3 is a view showing an embodiment of an image sensor;

FIG. 6 is a view showing another embodiment of an image sensor;

FIG. 7 is a view showing a further embodiment of an image sensor;

FIG. 9 is a view showing regions of image detection pixels used to process image information of phase difference detection pixels; and FIG. 10 is a view showing only G pixels in the regions of the image detection pixels.

DESCRIPTION OF SPECIFIC EMBODIMENTS

Figure 1:
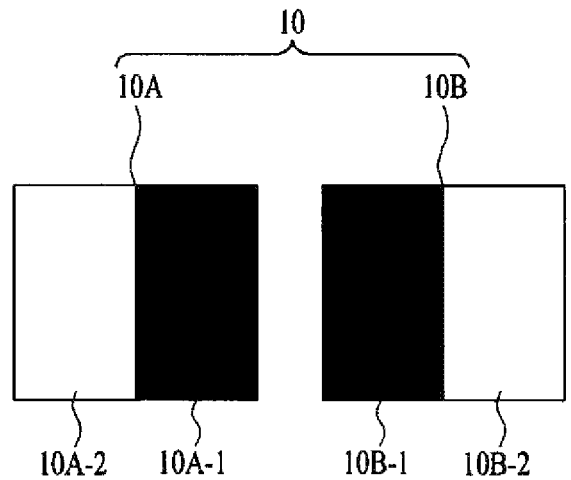
FIG. 1 is a view showing an embodiment of phase difference detection pixels.

Hereinafter, embodiments will be described with reference to the annexed drawings.

Relational terms, such as 'first' and 'second' and 'upper part' and 'lower part', are used only to distinguish between one subject or element and another subject and element without necessarily requiring or involving any physical or logical relationship or sequence between such subjects or elements.

In the drawings, the thicknesses or sizes of respective layers are exaggerated, omitted, or schematically illustrated for convenience and clarity of description. Further, the sizes of the respective elements do not denote the actual sizes thereof.

FIG. 1 is a plan view showing phase difference detection pixels 10 according to an embodiment.

The phase difference detection pixels 10 may be pixels configured such that portions of regions formed by dividing openings of the pixels in a vertical direction are shielded (10A-1 and 10B-1). The portions of the regions of the openings may be shielded such that the phase difference detection pixels 10 have limited light receiving regions.

The phase difference detection pixels 10 may include two types of phase difference detection pixels 10A and 10B based on arrangement of the limited light receiving regions 10A-1 and 10B-1.

The phase difference detection pixels 10 may include a first group pixel 10A having a shield region deviated to one side of the opening region of the pixel and a second group pixel 10B having a shield region deviated to the other side of the opening region of the pixel. The shield region of the second group pixel 10B is opposite to that of the first group pixel 10A.

A phase difference between a pair of images generated from optical signals input to the first group pixel 10A and the second group pixel 10B, which are phase difference detection pixels, may be detected to perform AF adjustment.

Hereinafter, embodiments of an image sensor 100 will be described with reference to the drawings. However, the number of pixels included in the image sensor is not limited to that shown in the drawings. The total number of pixels included in the image sensor may be less than or greater than that shown in the drawings.

Figure 2:
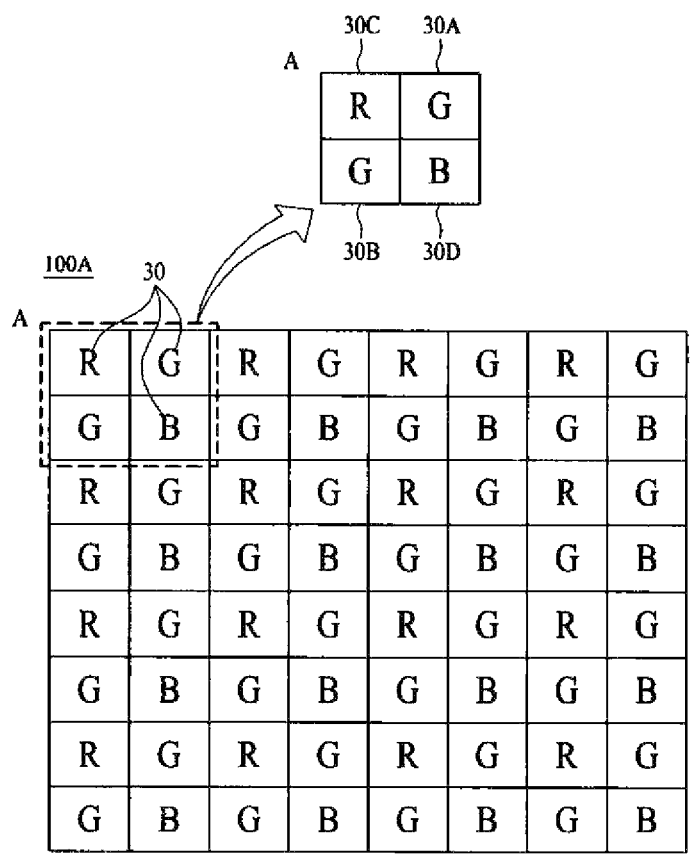
FIG. 2 is a view showing arrangement of image detection pixels.

FIG. 2 is a view showing an image sensor 100A in which image detection pixels 30 are arranged.

The image detection pixels 30 may be color pixels. The image detection pixels 30 may constitute a plurality of lattice units. The lattice units may be arranged constitute a lattice pattern. In a case in which the image detection pixels 30 are color pixels, the color pixels may include red, green, and blue. However, the color pixels are not limited to the illustrated colors.

In FIG. 2, portions indicated by R, and B indicate red, green, and blue, respectively.

Referring to FIG. 2, the image detection pixels 30 of the image sensor 100A are divided into a plurality of lattice units A each having a 2×2 matrix, which is arranged to constitute a lattice pattern.

Four pixels constituting each lattice unit A may include a first pixel 30A and a second pixel 30B opposite to each other in a first diagonal direction and a third pixel 30C and a fourth pixel 30D opposite to each other in a second diagonal direction intersecting the first diagonal direction. G pixels may be arranged on the first and second pixels 30A and 30B of each lattice unit A, and R and B pixels may be arranged on the third and fourth pixels 30C and 30D, respectively.

Each lattice unit A may be a Bayer arrangement in which four pixels are arranged in a 2×2 matrix. In addition, each lattice unit A constituting the lattice pattern may have a 3×3 matrix or a 4×4 matrix. However, the disclosure is not limited thereto. Each lattice unit A may have various matrix configurations.

The phase difference detection pixels 10 may be arranged on the first and second pixels 30A and 30B of each lattice unit A. For example, the phase difference detection pixels 10 may be arranged on the G pixels.

The lattice units A may constitute a lattice pattern of an n×m matrix, where n and m are natural numbers, and n and m may be equal to or different from each other.

The image sensor 100A may include a photoelectric element for converting an input optical signal into an electrical signal.

The image sensor 100A may convert an optical signal input from the outside into an electrical signal to output image information. In addition, the image sensor 100A may convert an input analog image signal into image information as digital data. In a case in which the image sensor 100A includes color pixels, the image sensor 100A may calculate color information from an input optical signal.

Figure 3:
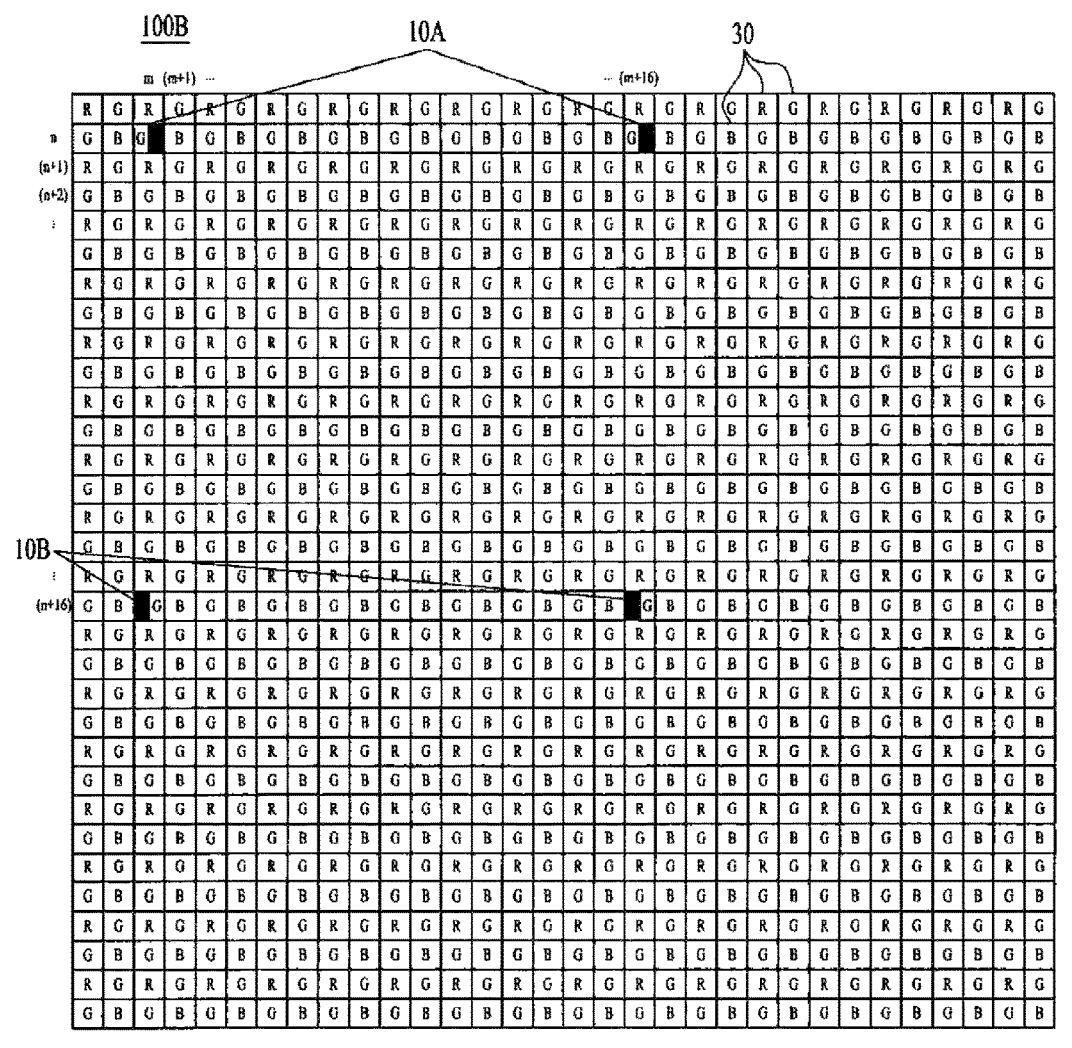

FIG. 3 is a view showing an image sensor 100B of an embodiment.

As shown in FIG. 3, the image sensor 100B may include a plurality of phase difference detection pixels 10 and a plurality of image detection pixels 30 arranged in a lattice pattern together with the phase difference detection pixels 10. The phase difference detection pixels 10 may be arranged at an interval of a predetermined number of pixels in the lattice pattern. The predetermined number of pixels may have a maximum value of 16.

In the embodiment of FIG. 3, the phase difference detection pixels 10 spaced apart from each other may be first group pixels 10A or second group pixels 10B.

The phase difference detection pixels 10 may be spaced apart from each other in a row direction or in a column direction. That is, a first phase difference detection pixel may be in the lattice pattern of the image sensor, and a second phase difference detection pixel may be spaced apart from the first phase difference detection pixel by 16 pixels in the row direction or in the column direction.

In a case in which the first phase difference detection pixel is a first group pixel 10A, the second phase difference detection pixel spaced apart from the first phase difference detection pixel may be a first group pixel 10A or a second group pixel 10B.

In a case in which the phase difference detection pixels 10 are arranged at an interval of a maximum of 16 pixels, a maximum of 15 image detection pixels 30 may be arranged between two phase difference detection pixels 10 spaced apart from each other.

For example, the phase difference detection pixels 10 may be spaced apart from each other in the row direction in the lattice pattern, and a maximum of 15 image detection pixels 30 may be arranged between two phase difference detection pixels 10 spaced apart from each other in the same row. That is, when one phase difference detection pixel is arranged on an m-th pixel in an n-th row in a horizontal direction, another phase difference detection pixel may be arranged on an (m+16)-th pixel in the same row.

In addition, the phase difference detection pixels 10 may be spaced apart from each other in the column direction in the lattice pattern, and a maximum of 15 image detection pixels 30 may be arranged between two phase difference detection pixels 10 spaced apart from each other in the column direction. That is, when one phase difference detection pixel is arranged on an n-th pixel in an m-th column in a vertical direction, another phase difference detection pixel may be arranged on an (n+16)-th pixel in the same column.

In the image sensor 100B of the embodiment, 16 pixels, which is the interval between the phase difference detection pixels 10 spaced apart from each other, may be an arrangement interval between the phase difference detection pixels 10 exhibiting an excellent image restoration ratio and high accuracy in focus detection.

Figure 4:
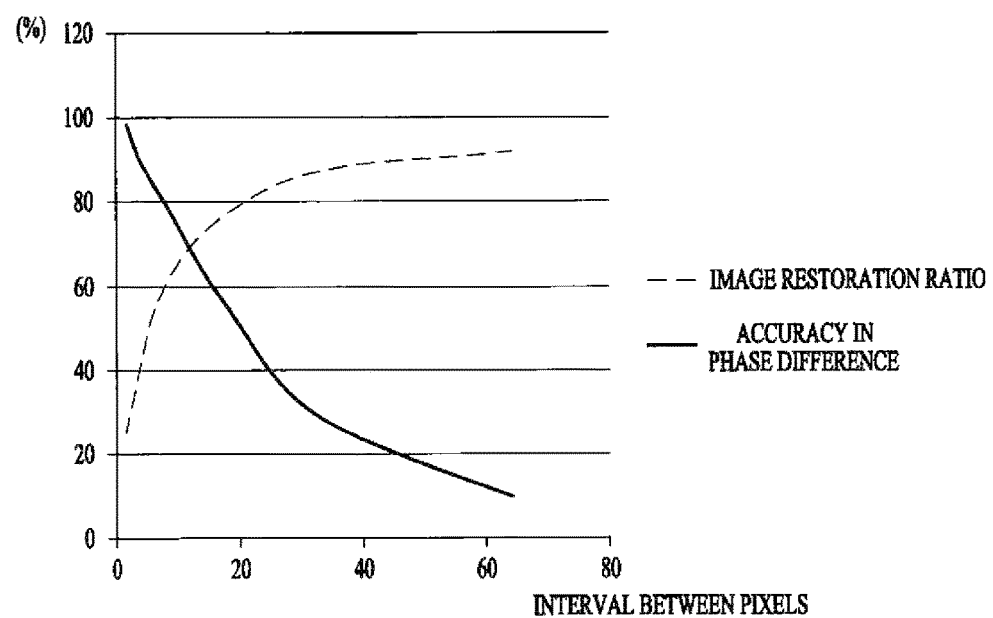
FIG. 4 is a view showing an image restoration ratio and phase difference accuracy based on an arrangement interval between phase difference detection pixels.

FIG. 4 is a graph showing a relationship between an interval, expressed as a number of pixels, between phase difference detection pixels 10 and an image restoration ratio or a relationship between an interval, expressed as a number of pixels, between phase difference detection pixels 10 and phase difference accuracy.

In FIG. 4, 'image restoration ratio' means a reproduction rate of an image photoelectrically converted and output by the image sensor 100 to a real image, and the phase difference accuracy means accuracy in focus detection using a phase difference detection type AF system.

Referring to results of FIG. 4, it can be seen that the image restoration ratio is increased as the interval between the phase difference detection pixels 10 is increased, whereas the phase difference accuracy is decreased as the interval between the phase difference detection pixels 10 is increased.

That is, when the interval at which the phase difference detection pixels 10 are arranged in the lattice pattern of the image sensor 100 is increased, the number of image detection pixels 30 in the limited total number of pixels of the image sensor 100 is increased with the result that the image restoration ratio is increased. However, the number of the phase difference detection pixels 10 is decreased with the result that information for output of images for focus detection is restricted, whereby the focus detection accuracy is lowered.

In addition, when the number of pixels arranged between the phase difference detection pixels 10 spaced apart from each other is decreased, the number of the phase difference detection pixels 10 among the limited total number of pixels of the image sensor 100 is increased. In this case, since the phase difference detection pixels 10 have restricted light receiving regions, restricted optical signals are input to the phase difference detection pixels 10 as compared with the image detection pixels 30 with the result that the image restoration ratio is decreased. However, phase difference values may be obtained from the relatively large pixels of the image sensor 100, whereby the focus detection accuracy is improved.

Referring to the graph of FIG. 4, in a case in which the interval between the phase difference detection pixels 10 is 10 to 20 pixels, reduction of the image restoration ratio is not great, whereby the focus detection accuracy is improved.

For example, when the interval between the phase difference detection pixels is 16 pixels, both the image restoration ratio and the accuracy in phase difference detection are approximately 70%, which are satisfactory.

When the interval between the phase difference detection pixels is 16 pixels, therefore, both the image restoration ratio, i.e. image quality, and the phase difference accuracy are satisfactory. In addition, in a case in which the phase difference detection type AF system is used, it is necessary to set the interval between phase difference detection pixels to a maximum of 16 pixels so as to secure AF accuracy.

Figure 5:
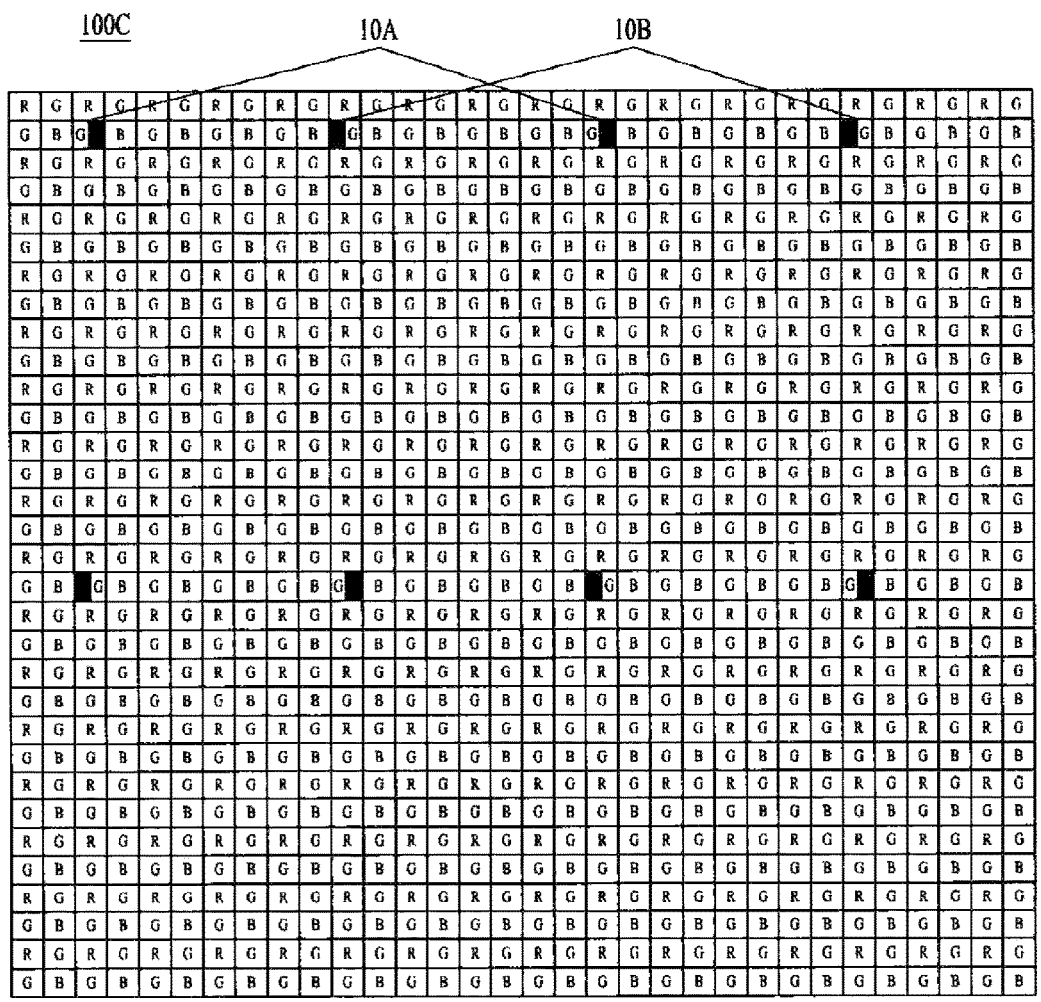
FIG. 5 is a view showing another embodiment of an image sensor.
Figure 6:
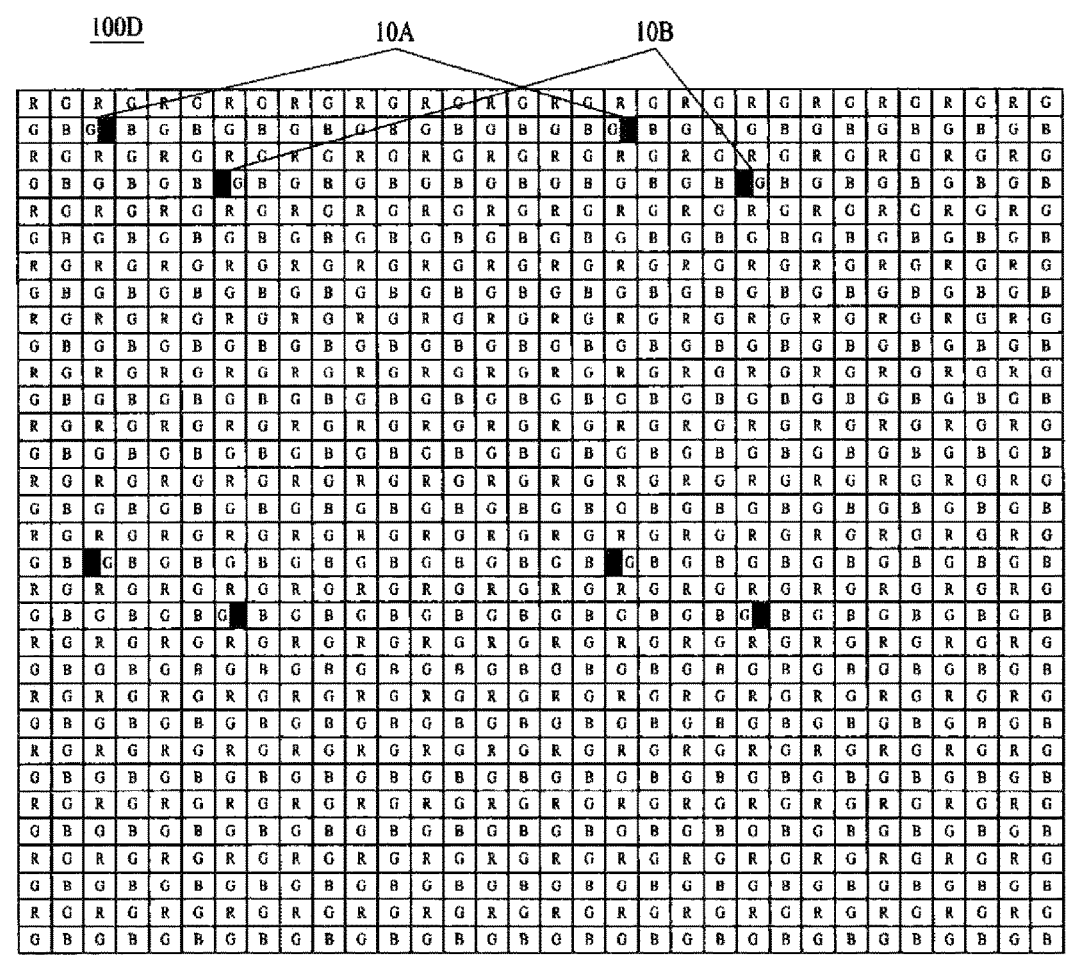
Figure 7:
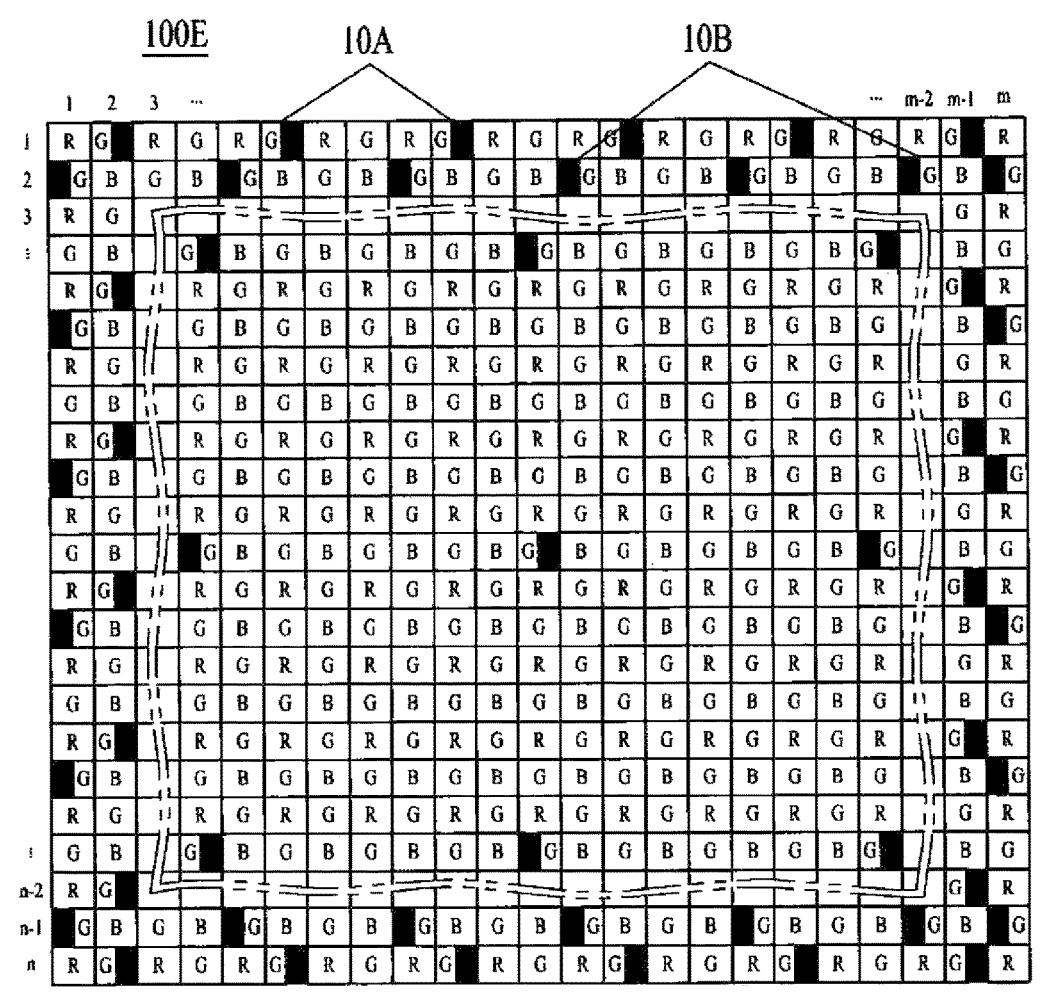

The phase difference detection pixels 10 of the image sensor 100 may be variously arranged in the lattice pattern. FIGS. 5 to 7 show various arrangements of phase difference detection pixels 10 in lattice patterns of image sensors 100c, 100D, and 100E.

The arrangement interval between the phase difference detection pixels 10 of the image sensor 100 may be changed based on desired image information.

For example, when a portion of a captured image does not require a high image restoration ratio, a relatively high number of phase difference detection pixels 10 may be arranged in a region of the image sensor corresponding to that portion of the image. In a photoelectrically converted portion in the region of the image sensor 100 in which the number of phase difference detection pixels 10 is increased, the image restoration ratio may be reduced, whereas accuracy in phase difference detection AF may be improved. In this case, the interval between the phase difference detection pixels may be 2 to 16 pixels.

On the other hand, when a portion of a captured image does not require high image quality, a relatively low number of phase difference detection pixels 10 may be arranged in a region of the image sensor corresponding to the portion of the image. In this case, image information of a relatively high number of image detection pixels 30 is output, whereby the image restoration ratio is increased.

At this time, the arrangement interval between the phase difference detection pixels 10 may be greater than in other regions the image sensor 100. In this case, the arrangement interval between the phase difference detection pixels 10 may be a maximum of 16 pixels. If the arrangement interval between the phase difference detection pixels 10 is greater than 16 pixels, accuracy in focus adjustment based on phase difference detection AF is greatly reduced compared to improvement of image quality.

In addition, in the phase difference detection AF system, phase difference may be obtained from two pieces of image information provided from phase difference detection pixels having shield regions deviated in opposite directions to adjust focus. Consequently, the interval between phase difference detection pixels having the same shield regions may be 16 pixels or more. However, the interval between the first group pixel 10A and the second group pixel 10B may be limited to 16 pixels or less.

FIG. 5 is a view showing another embodiment of an image sensor 100C.

In the image sensor 100C, an interval between first group pixels 10A spaced apart from each other may be 16 pixels, and an interval between a first group pixel 10A and a second group pixel 10B spaced apart from each other may be 2 to 16 pixels.

Referring to FIG. 5, the interval between first group pixels 10A or second group pixels 10B having identically deviated shield regions, among a plurality of phase difference detection pixels 10A and 10B spaced apart from each other in the same row in a horizontal direction (row direction), may be 16 pixels.

In addition, the second group pixels 10B may be arranged between the first group pixels 10A spaced apart from each other, and the interval between a first group pixel 10A and a second group pixel 10B having differently deviated shield regions may be 8 pixels.

In FIG. 5, there is shown a case in which the interval between the first group pixel 10A and the second group pixel 10B having differently deviated shield regions is 8 pixels. However, the disclosure is not limited thereto.

Since the phase difference detection pixels 10 may be arranged on G pixels in a lattice pattern of the image sensor 100C, the interval between the first group pixel 10A and the second group pixel 10B may be an even number of pixels ranging from 2 to 16.

In the embodiment of FIG. 5, a first group pixel 10A and a second group pixel 10B having differently deviated shield regions may be spaced apart from each other in a vertical direction (column direction) of the image sensor 100C. In the embodiment of FIG. 5, the arrangement interval between the phase difference detection pixels 10 spaced apart in the horizontal direction (row direction) may be different from that between the phase difference detection pixels 10 spaced apart in the vertical direction (column direction).

Since optical signals are received from phase difference detection pixels having differently deviated shield regions for phase difference detection in the phase difference detection AF system, accurate focus detection is possible in a case in which the interval between the phase difference detection pixels 10A and 10B having differently deviated shield regions, i.e. the first group pixel 10A and the second group pixel 10B, is less than 16 pixels in the embodiment of FIG. 5.

FIG. 6 is a view showing another embodiment of an image sensor 100D including phase difference detection pixels 10.

First group pixels 10A of the phase difference detection pixels 10 may be spaced apart from each other at a predetermined interval in a horizontal direction (row direction) such that the first group pixels 10A are arranged in a first arrangement line, and second group pixels 10B may be spaced apart from each other at a predetermined interval in the horizontal direction (row direction) such that the second group pixels 10B are arranged in a second arrangement line. The first arrangement line and the second arrangement line may be alternately arranged in a vertical direction (column direction) of a lattice pattern.

The first group pixels 10A arranged in the first arrangement line and the second group pixels 10B arranged in the second arrangement line may be arranged in different columns.

The interval between the first group pixels 10A arranged in the first arrangement line may be 16 pixels, and the interval between the second group pixels 10B arranged in the second arrangement line may be 16 pixels.

In a case in which phase difference detection AF is performed using the image sensor 100D shown in FIG. 6, focus adjustment may be performed based on a phase difference between images detected from the first arrangement line and the second arrangement line.

In addition, although not shown, an image sensor 100 of another embodiment may include a third arrangement line in which the first group pixels 10A and the second group pixels 10B are alternately arranged in the row direction and a fourth arrangement line in which the second group pixels 10B and the first group pixels 10A are alternately arranged in the row direction.

The third arrangement line and the fourth arrangement line may be alternately arranged in the column direction.

Distribution density of the phase difference detection pixels may be gradually increased toward an outer portion of the image sensor 100.

FIG. 7 is a view showing another embodiment of an image sensor 100E.

In FIG. 7, the arrangement interval between phase difference detection pixels 10 of the image sensor 100E is gradually decreased toward an outer portion of the image sensor 100E such that distribution density of the phase difference detection pixels 10 at the outer portion of the image sensor 100E is increased.

In the image sensor 100E, a proportion of image detection pixels 30 at a central portion of a capture image is increased with the result that it is possible to obtain an image having a high image restoration ratio. On the other hand, a proportion of phase difference detection pixels 10 at an outer portion of the image is increased with the result that the image restoration ratio is lowered, whereas accuracy in phase difference detection is improved.

In the image sensors 100B, 100C, 100D, and 100E of the above embodiments, the arrangement interval between the phase difference detection pixels 10 may be set to 16 pixels or less so as to improve focus detection accuracy without deterioration of image quality even when the phase difference detection pixels are applied to the image sensors. In addition, the arrangement of the phase difference detection pixels 10 in the image sensors 100B, 100C, 100D, and 100E may be changed based on desired image quality so as to adjust the image restoration ratio and the focus accuracy.

Hereinafter, an image pick-up apparatus including the image sensor 100B, 100C, 100D, or 100E will be described with reference to the accompanying drawings. However, the disclosure is not limited thereto. That is, the image sensors 100B, 100C, 100D, and 100E may be variously used.

Figure 8:
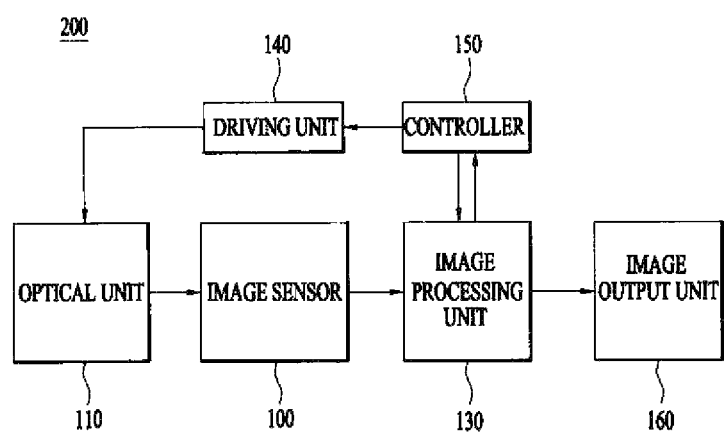
FIG. 8 is a block diagram of an image pick-up apparatus according to an embodiment.

FIG. 8 is a block diagram showing schematic configuration of an image pick-up apparatus 200 according to an embodiment.

The image pick-up apparatus 200 may include an optical unit 110, an image sensor 100, an image processing unit 130, a driving unit 140, a controller 150, and an image output unit 160.

The optical unit 110 may include a lens and a lens moving unit. In order to acquire an image for a subject, the optical unit 110 may receive light incident from the outside and output the received light to the image sensor 100.

The optical unit 110 may include a plurality of lenses, such as a focus lens and a zoom lens. The positions of the lenses may be adjusted by the lens moving unit.

Optical information output from the optical unit 110 may be transmitted to the image sensor 100.

The image sensor 100 may be any one of the image sensors 100B, 100C, 100D, and 100E of the embodiments as described above. The image sensor 100 may receive the optical information of the subject incident through the lens of the optical unit 110 and convert the received optical information into an electrical signal. The image sensor 100 may be a charge-coupled device (CCD) sensor or a complementary metal-oxide-semiconductor (CMOS) sensor.

The image processing unit 130 may generate image information based on the electrical signal received from the image sensor 100 and transmit the generated image information to the image output unit 160, which displays the image information as an image.

For example, the image processing unit 130 may generate image information of a picked-up image from electrical signals of image detection pixels 30 received from the image sensor 100, and generate image information for focus adjustment based on electrical signals of phase difference detection pixels 10.

In addition, the image processing unit 130 may obtain information for preparing a depth map as well as two-dimensional image information from the electrical signals of the received phase difference detection pixels 10. Three-dimensional image information as well as the two-dimensional image information may be calculated from the information regarding the depth map.

The image information for focus adjustment generated by the image processing unit 130 may be transmitted to the controller 150.

The controller 150 may control overall operation of the image pick-up apparatus. The controller 150 may enable the driving unit 140 for driving the optical unit 110 and the image processing unit 130.

The controller 150 may control the optical unit 110 to control an input optical signal. The input optical signal may be converted into an electrical signal by the image sensor 100, and the electrical signal may be transmitted to the image processing unit 130. The image information for focus adjustment processed and output by the image processing unit 130 may be fed back to the controller 150, which may calculate the quantity of focus deviation.

The controller 150 may calculate the quantity of movement of the optical unit 110 necessary for phase difference detection type AF adjustment based on the calculated quantity of focus deviation. Information regarding the calculated quantity of movement of the optical unit 110 may be transmitted from the controller 150 to the driving unit 140. As a result, the optical unit 110 may be adjusted to perform phase difference detection type AF control.

The driving unit 140 may move the lens of the optical unit 110 based on the information regarding the quantity of movement of the lens received from the controller 150.

The image output unit 160 may display the image information received from the image processing unit 130. The image output unit 160 may provide visual image information to a user. To this end, the image output unit 160 may include a display unit, such as a liquid crystal display (LCD) panel or an organic light-emitting diode (OLED) panel.

In a case in which the image processing unit 130 of the image pick-up apparatus may read signals from all of the pixels of the image sensor 100 to generate an image for a subject, it is necessary to correct gains for signals detected by the phase difference detection pixels 10 such that the signals detected by the phase difference detection pixels 10 have sensitivity equivalent to that of signals detected by the image detection pixels 30 or to interpolate the phase difference detection pixels 10 based on the signals detected by the image detection pixels 30.

The image processing unit 130 of the image pick-up apparatus may process image information of a plurality of phase difference detection pixels 10 with image information of a plurality of image detection pixels 30 arranged so as to surround the phase difference detection pixels. That is, the image information of the phase difference detection pixels 10 may be corrected and processed using the image information of the neighboring image detection pixels 30.

That is, image information of the image detection pixels 30 surrounding the phase difference detection pixels 10 may be used without change, interpolation may be performed based on the image information of the image detection pixels 30, or a plurality of pieces of image information of the image detection pixels 30 may be averaged.

FIG. 9 is a view showing regions S1 and S2 including image detection pixels 30 used to process image information of phase difference detection pixels 10.

In FIG. 9, the image information of the phase difference detection pixels 10 may be processed using image information of image detection pixels 30 included in lattice patterns each having a 7×7 matrix, at the center of which a corresponding one of the phase difference detection pixels 10 is located.

For example, in FIG. 9, image information of a first group pixel 10A may be corrected using information of image detection pixels of a region S1, and image information of a second group pixel 10B may be corrected using information of image detection pixels of a region S2.

FIG. 10 is a view showing only G pixels in the region S1 indicated by a dotted line in FIG. 9. Referring to FIG. 10, image information may be corrected and processed using image signals of G pixels of the image detection pixels 30 surrounding the phase difference detection pixel 10A.

That is, a signal value of the G pixel on which the phase difference detection pixel may be interpolated from values of image information of pixels G1 to G24 or corrected based on the average of these values to process image information. Only the image information of the G pixels adjacent to the phase difference detection pixel 10A may be selected to correct the image information of the phase difference detection pixel 10A.

In FIG. 10, there is shown a case in which a lattice pattern surrounding the phase difference detection pixel 10 has a 7×7 matrix. However, the region of the lattice pattern of the image detection pixels 30 selected based on the arrangement interval between the phase difference detection pixels 10 in the image sensor 100 may be changed.

In a case in which the image information regarding the phase difference detection pixels 10 is obtained by correcting the image information of the image detection pixels 30, correction accuracy may be improved as the number of selected image detection pixels 30 is increased.

The image pick-up apparatus includes the image sensor 100B, 100C, 100D, or 100E of the previous embodiments. Consequently, it is possible to improve focus accuracy without deterioration of image quality.

As is apparent from the above description, in an image sensor according to an embodiment, an arrangement interval between phase difference detection pixels is optimized to improve accuracy in auto focus adjustment without reduction of an image restoration ratio Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image sensor comprising:
a plurality of phase difference detection pixels; and
a plurality of image detection pixels arranged in a lattice pattern together with the phase difference detection pixels,
wherein the phase difference detection pixels are arranged at an interval of a predetermined number of pixels in the lattice pattern, and the predetermined number of pixels has a maximum value of 16,
wherein the lattice pattern comprises at least one lattice unit, and the at least one lattice unit has a 2×2 matrix,
wherein the lattice unit comprises:
a first color pixel and a second color pixel, which are opposite to each other in a first diagonal direction; and
a third color pixel and a fourth color pixel, which are opposite to each other in a second diagonal direction intersecting the first diagonal direction,
wherein the phase difference detection pixels are arranged on the first and second color pixels,
wherein the first and second colors are green, and
wherein the image detection pixels are green pixels arranged in lattice patterns each having a 7×7 matrix, at a center of which a corresponding one of the phase difference detection pixels is located.

2. The image sensor according to claim 1, wherein the phase difference detection pixels comprise:
first group pixels each having a shield region deviated at one side; and
second group pixels each having a shield region deviated at the other side.

3. The image sensor according to claim 2, wherein the first group pixels are spaced apart from each other at an interval of 16 pixels, and each of the first group pixels and each corresponding one of the second group pixels are spaced apart from each other at an interval of 2 to 16 pixels.

4. The image sensor according to claim 2, wherein the first group pixels are spaced apart from each other at a predetermined interval in a row direction such that the first group pixels are arranged in a first arrangement line, and the second group pixels are spaced apart from each other at a predetermined interval in the row direction such that the second group pixels are arranged in a second arrangement line, the first arrangement line and the second arrangement line being alternately arranged in a column direction.

5. The image sensor according to claim 2, wherein distribution density of the phase difference detection pixels is gradually increased toward an outer portion of the image sensor.

6. An image pick-up apparatus comprising:
an optical unit for receiving an optical signal;
an image sensor for generating image information from the optical signal received from the optical unit; and
an image processing unit for processing the image information,
wherein the image sensor comprises:
a plurality of phase difference detection pixels; and
a plurality of image detection pixels arranged in a lattice pattern together with the phase difference detection pixels,
wherein the phase difference detection pixels are arranged at an interval of a predetermined number of pixels in the lattice pattern, and the predetermined number of pixels has a maximum value of 16,
wherein the lattice, pattern comprises at least one lattice unit, and the at least one lattice unit has a 2×2 matrix,
wherein the lattice unit comprises:
a first color pixel and a second color pixel, which are opposite to each other in a first diagonal direction; and
a third color pixel and a fourth color pixel, which are opposite to each other in a second diagonal direction intersecting the first diagonal direction,
wherein the phase difference detection pixels are arranged on the first and second color pixels,
wherein the first and second colors are green, and
wherein the image detection pixels are green pixels arranged in lattice patterns each having a 7×7 matrix, at a center of which a corresponding one of the phase difference detection pixels is located.

7. The image pick-up apparatus according to claim 6, wherein the phase difference detection pixels comprise:
first group pixels each having a shield region deviated at one side; and
second group pixels each having a shield region deviated at the other side.

8. The image pick-up apparatus according to claim 7, wherein the first group pixels are spaced apart from each other at an interval of 16 pixels, and each of the first group pixels and each corresponding one of the second group pixels are spaced apart from each other at an interval of 2 to 16 pixels.

9. The image pick-up apparatus according to claim 7, wherein the first group pixels are spaced apart from each other at a predetermined interval in a row direction such that the first group pixels are arranged in a first arrangement line, and the second group pixels are spaced apart from each other at a predetermined interval in the row direction such that the second group pixels are arranged in a second arrangement line, the first arrangement line and the second arrangement line being alternately arranged in a column direction.

10. The image pick-up apparatus according to claim 7, wherein distribution density of the phase difference detection pixels is gradually increased toward an outer portion of the image sensor.

11. An image pick-up apparatus comprising:
an optical unit for receiving an optical signal;
an image sensor for, generating image information from the optical signal received from the optical unit; and
an image processing unit for processing the image information,
wherein the image sensor comprises:
a plurality of phase difference detection pixels; and
a plurality of image detection pixels arranged in a lattice pattern together with the phase difference detection pixels,
wherein the phase difference detection pixels are arranged at an interval of a predetermined number of pixels in the lattice pattern, and the predetermined number of pixels has a maximum value of 16,
wherein the image processing unit processes the image information of the phase difference detection pixels using image information of the image detection pixels surrounding the phase difference detection pixels, and
wherein the image detection pixels are green pixels arranged in lattice patterns each having a 7×7 matrix, at a center of which a corresponding one of the phase difference detection pixels is located.

12. The image pick-up apparatus according, to claim 11, wherein the lattice pattern comprises at least one lattice unit, and the at least one lattice unit has a 2×2 matrix.

13. The image pick-up apparatus according to claim 12, wherein the lattice unit comprises:
a first color pixel and a second color pixel, which are opposite to each other in a first diagonal direction; and
a third color pixel and a fourth color pixel, which are opposite to each other in a second diagonal direction intersecting the first diagonal direction.

14. The image pick-up apparatus according to claim 12, wherein the phase difference detection pixels are arranged on the first and second color pixels.

15. The image pick-up apparatus according to claim 13, wherein the first and second colors are green.

* * * * *